(12) United States Patent
Brück et al.

(10) Patent No.: US 8,048,823 B2
(45) Date of Patent: *Nov. 1, 2011

(54) METALLIC FOIL FOR PRODUCING HONEYCOMB BODIES, HONEYCOMB BODY PRODUCED THEREFROM AND METHOD OF PRODUCING A HONEYCOMB BODY USING A FOIL

(75) Inventors: Rolf Brück, Bergisch Gladbach (DE); Sven Schepers, Troisdorf (DE); Jan Hodgson, Troisdorf (DE); Kait Althöfer, Wiehl (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,094

(22) Filed: Mar. 8, 2010

(65) Prior Publication Data

US 2010/0196735 A1    Aug. 5, 2010

Related U.S. Application Data

(63) Continuation of application No. PCT/EP2008/059961, filed on Jul. 30, 2008.

(30) Foreign Application Priority Data

Sep. 7, 2007 (DE) .......................... 10 2007 042 616

(51) Int. Cl.
  *F01N 3/28* (2006.01)
  *B01J 35/04* (2006.01)
  *B32B 3/12* (2006.01)
  *B32B 15/04* (2006.01)

(52) U.S. Cl. ............... 502/439; 502/527.22; 428/593; 428/607; 428/612; 428/472; 428/472.2; 228/181; 29/890

(58) Field of Classification Search ............ None
See application file for complete search history.

(56) References Cited

U.S. PATENT DOCUMENTS 5,342,454 A * 8/1994 Hayakawa et al. ........... 148/113
(Continued)

FOREIGN PATENT DOCUMENTS

DE        4403500 A1    8/1995
(Continued)

OTHER PUBLICATIONS

Machine translation of DE 3911619. 2 pages. Oct. 1990.*

(Continued)

*Primary Examiner* — John J Zimmerman
(74) *Attorney, Agent, or Firm* — Laurence A. Greenberg; Werner H. Stemer; Ralph E. Locher

(57) ABSTRACT

A foil for producing a metal honeycomb or catalyst carrier body, has an average surface roughness of more than 0.3 μm (micrometers) on both surfaces in at least one measurement direction. Preferably, the foil is rolled and has an average surface roughness of more than 0.3 or 0.5 μm, especially approximately 0.6 μm, in the rolling direction and/or transverse thereto. The foil can have an oxide coating with a thickness between 60 and 80 or between 70 and 75 nm (nanometers) on both surfaces. Despite the roughness, an even thickness of the oxide coating with a tolerance of less than 10% or 5% is advantageous on both surfaces. The foil allows production of durable honeycomb bodies, especially for exhaust systems of internal combustion engines, requiring an exactly defined distribution and quality of compounds in the interior thereof. A honeycomb body and method of production using a foil, are also provided.

25 Claims, 2 Drawing Sheets

U.S. PATENT DOCUMENTS

| | | |
|---|---|---|
| 5,874,153 A | 2/1999 | Bode et al. |
| 5,981,026 A | 11/1999 | Bode et al. |
| 6,689,328 B1 | 2/2004 | Otani et al. |
| 6,699,587 B2 | 3/2004 | Iwami et al. |
| 6,761,857 B1 * | 7/2004 | Takahashi et al. ............ 422/180 |
| 2005/0139291 A1 * | 6/2005 | Taira et al. .................... 148/277 |
| 2006/0166029 A1 * | 7/2006 | Inaguma et al. ............. 428/653 |
| 2006/0240270 A1 * | 10/2006 | Kuroda et al. ............. 428/472.2 |
| 2008/0257404 A1 * | 10/2008 | Schuisky et al. .............. 136/255 |
| 2009/0104089 A1 * | 4/2009 | Hirth et al. .................... 422/177 |
| 2010/0184590 A1 * | 7/2010 | Althofer et al. .............. 502/185 |

FOREIGN PATENT DOCUMENTS

| | | | |
|---|---|---|---|
| EP | 0392203 A1 | | 10/1990 |
| EP | 1251250 A1 | | 10/2002 |
| EP | 0985450 B1 | | 4/2003 |
| JP | 2-57670 | * | 2/1990 |
| JP | 3-23309 | * | 1/1991 |

OTHER PUBLICATIONS

International Search Report dated Nov. 11, 2008.

* cited by examiner

METALLIC FOIL FOR PRODUCING HONEYCOMB BODIES, HONEYCOMB BODY PRODUCED THEREFROM AND METHOD OF PRODUCING A HONEYCOMB BODY USING A FOIL

CROSS-REFERENCE TO RELATED APPLICATION

This is a continuation application, under 35 U.S.C. §120, of copending International Application No. PCT/EP2008/059961, filed Jul. 30, 2008, which designated the United States; this application also claims the priority, under 35 U.S.C. §119, of German Patent Application DE 10 2007 042 616.1, filed Sep. 7, 2007; the prior applications are herewith incorporated by reference in their entirety.

BACKGROUND OF THE INVENTION

Field of the Invention

The present invention relates to a metallic foil for producing honeycomb bodies, a honeycomb body produced therefrom and a method of producing a honeycomb body, using a metallic foil composed of a high-temperature corrosion resistant steel, in particular in exhaust-gas purification components of internal combustion engines, preferably in motor vehicles.

It has long been known to use metallic foils in the production of honeycomb bodies, in particular for exhaust-gas systems of internal combustion engines. Due to the high temperatures in such applications, use is usually made of chromium-containing and aluminum-containing steels. Typical foils have a thickness of 20 to 180 μm (micrometers), in particular in a range from 30 to 120 μm, and are produced by rolling. In particular, when such foils are used for metallic honeycomb bodies and other exhaust-gas purification components, particular demands must also be made on the surface.

The property of high-temperature corrosion resistance arises specifically from the fact that a protective oxide coat is formed on the surface of such foils, which oxide coat is composed primarily of aluminum oxide, in particular γ-aluminum oxide (gamma aluminum oxide), in the case of aluminum-containing steels. In general, honeycomb bodies produced from metallic foils in exhaust-gas systems are coated with a catalytically active material which is applied in the form of a so-called washcoat. In that case, the surface of the foil must additionally permit good adhesion of the additional coating.

Finally, a further problem must be taken into consideration, specifically that the connecting technique used in the production of honeycomb bodies from metallic foils is responsible for the stability of the honeycomb body. Many years of experience have shown that, in a honeycomb body, which is produced from differently-structured foils, not all of the connecting points between the foils should be connected to one another, rather it is expedient to provide connections only in selected regions, since only in that way is it possible to ensure simultaneously high stability and elasticity under fluctuating thermal loading. As a connecting technique, consideration is given in particular to brazing or hard soldering, preferably high-temperature vacuum brazing. At high temperatures, however, metallic foils also become connected to one another at their contact points by diffusion connections as a function of various parameters. That may be utilized in a targeted fashion to produce connections, but may also be considerably disruptive if certain contact regions are specifically not to be connected to one another. The surface composition of the foils plays an important role for those processes.

SUMMARY OF THE INVENTION

It is accordingly an object of the invention to provide a metallic foil for producing honeycomb bodies, a honeycomb body produced therefrom and a method of producing a honeycomb body using a foil, which overcome the hereinaforementioned disadvantages of the heretofore-known foils, bodies and methods of this general type and which specify a metallic foil with a surface composition which has improved properties for the production of a honeycomb body, in particular for the described applications.

With the foregoing and other objects in view there is provided, in accordance with the invention, a foil for producing a metallic honeycomb body, in particular a catalyst carrier body. The foil comprises two opposite foil surfaces, and a high-temperature-resistant material having a mean surface roughness of greater than 0.3 μm (micrometers) in at least one measurement direction, on both of the surfaces.

With the objects of the invention in view, there is also provided a honeycomb body, comprising a plurality of foil layers of at least one foil according to the invention, including adjacent foil layers. Brazed connecting points, in particular high-temperature vacuum-brazed connecting points, are disposed between the adjacent foil layers only in selectively predetermined regions.

With the objects of the invention in view, there is concomitantly provided a method of producing a honeycomb body. The method comprises producing a brazed honeycomb body with a foil according to the invention having a mean surface roughness of 0.6 μm to 0.8 μm. In particular, an oxide coat with a thickness between 60 and 80 nm, preferably between 70 and 75 nm (nanometers), is placed on both of the foil surfaces.

A foil according to the invention is composed of a high-temperature-resistant material and has an increased surface roughness, specifically a mean surface roughness of greater than 0.3 μm. It is important, inter alia, for the production of brazed connections, for brazing material, which is applied for example in powder form in certain regions, to be able to be distributed over a small surrounding region by flowing when the melting temperature is reached. The flowing and wetting properties of a brazing material on a surface are strongly dependent on the surface roughness of the material which is used. The surface roughness also influences the probability of the formation of diffusion connections. A relatively rough surface with a mean surface roughness of greater than 0.3 μm has proven to be advantageous. The specified roughness values are arithmetic mean values of the roughness, usually abbreviated as $R_a$, measured by using the stylus method. That method is described, for example, in an article entitled "Rauheitsmessung an gewalzten Feinblechen" ["Roughness Measurement of Rolled Fine Metal Sheets"] in the periodical "Stahl and Eisen 109" ["Steel and iron 109"] (Year: 1989, No. 12; pages 589 and 590).

The surface roughness specified in that case is present in particular where brazed connections and/or contact points of adjacent foils are provided in the honeycomb body. The surface roughness is also defined by the material of the foil or its mechanical treatment. In that respect, that in particular does not mean the roughness of coatings or coats present on the foil. If the foil (and/or the honeycomb body) is formed with a coating/coat, then the surface roughness of the foil itself (that is to say for example of the metallic basic material), is accordingly relevant.

Rolled foils having a surface roughness in the rolling direction and/or in the transverse direction with respect thereto which have a mean surface roughness of greater than 0.3 μm, preferably greater than 0.5 μm, particularly preferably greater than 0.6 μm, are particularly suitable in conjunction with the present invention. The roughnesses yield particularly expedient properties for processing, for brazing, for preventing diffusion connections and for high-temperature corrosion resistance. An upper limit for the roughness is approximately 0.8 to 1 μm since, with very rough surfaces, brazing material no longer flows and wets to a sufficient extent. In order to obtain corresponding wetting with (in particular) brazing powder and to simultaneously reliably prevent a diffusion connection from forming later, it is preferable for the surface roughness (if appropriate in both measurement directions) to lie in a range of from 0.53 to 0.68 μm.

A foil according to the invention preferably also has on each of its surfaces an oxide coat with a thickness from 60 to 80 nm (nanometers), preferably 70 to 75 nm. That thickness range has proven to be particularly expedient for the production of honeycomb bodies with the desired properties, in particular for use in exhaust-gas systems of motor vehicles. In honeycomb bodies of that type, differently structured foils are typically layered and/or wound one on top of each other, wherein the oxide coat should as far as possible have no adverse effect on the mechanical production steps. In the stacked and/or wound honeycomb body, there are contact points between the stacked and/or wound foils and/or between foils and other components, for example a casing tube or a metallically encased sensor. Through the use of various known methods, it is possible in some regions for the contact points to be made into fixed connecting points, for example by applying brazing material and subsequently heating. The brazed or hard-soldered connections which are formed are not significantly degraded by an oxide coat with the thickness specified. Secondly, the oxide coat in connection with the roughness according to the invention prevents undesired diffusion connections from forming at contact points which are not to be connected during the heating of the honeycomb body. For that purpose, the oxide coat is thick enough for the desired selective production of connecting points to be aided considerably through the use of the roughness and the oxide coat.

The invention can preferably be applied to steels with chromium and aluminum constituents, in particular steels with aluminum contents of 1 to 5%. An aluminum content of up to 5% is particularly expedient for high-temperature corrosion resistance, without having significant disadvantages for the other properties of a foil.

The basic material of the foil particularly preferably has 14 to 25% chromium and 3 to 5% aluminum. Use is made in particular of the steels 1.4767 (20% chromium, 5% aluminum) or 1.4725 (14% chromium, 4% aluminum) according to the German Steel Key.

An oxide coat on the surfaces of the foil according to the invention is preferably composed substantially of aluminum oxide, in particular γ-aluminum oxide.

It is particularly advantageous for the oxide coat to have a uniform thickness, with a tolerance of less than 10%, preferably less than 5%, on all surfaces of the honeycomb body. In the targeted selective production of connecting points and the targeted prevention of connections in other regions, it is important for similar conditions to prevail at all of the connecting points, for which reason a low tolerance of the oxide coat is advantageous.

The property of the steel foils under consideration of forming diffusion connections at contact points at high temperatures without particular surface properties, and the property of the surface roughness according to the invention possibly in connection with suitable oxide coats of preventing such connections, may also expediently be utilized in the production of a honeycomb body by virtue of the oxide coat being removed in certain regions in which connections are desired and/or the roughness being reduced. If the oxide coat is removed, for example in strips, and/or the surface is smoothed, durable diffusion connections are produced in a subsequent honeycomb body in precisely those locations where the oxide coat has been removed, while no connections or only weak connections (weak means in particular a maximum of 10% or even only 6% diffusion connections in this region) are formed at other connecting points. A honeycomb body having the desired properties can be produced in this way.

However, the described properties yield their particular advantages in particular if the connecting points are produced in a honeycomb body according to the invention through the use of brazing or hard soldering, in particular high-temperature vacuum brazing. Despite the high temperature in that brazing process, only few or weak diffusion connections are produced in the non-brazed regions.

The advantages are obtained in particular in honeycomb bodies in which no large-area brazing material regions are provided but rather numerous contact points of the foils with one another without a brazing point bear against one another and if appropriate to enable relative movements relative to one another (for example due to the fluctuating thermal and dynamic loads in the exhaust-gas system in later use). It is therefore important specifically then for actually only the (few) desired contact points to be connected to one another through the use of brazing material and, at the others, for no diffusion connection to significantly influence this behavior of the foils.

A honeycomb body of that type has a multiplicity of inner contact points of the foils with one another. Those contact points are for the most part formed by virtue of a section of a structured metallic foil bearing against another section of an adjacent (smooth and/or structured) metallic foil. The contact points thus run regularly in contact lines, which run in the direction of a structure, of the adjacent sections of metallic foils. When the honeycomb body is viewed in cross section, at most 20% of the contact points are thus now used to form the brazing points which fix the honeycomb structure. No brazing point is formed at the other contact points (at least in the cross section under consideration). The proportion of brazing points is preferably less than 10%, or even 5%, of the contact points.

Honeycomb bodies according to the invention may, after their production, be provided with an additional coating, in particular with a so-called washcoat and/or catalytically active materials. High-grade metals such as platinum or rhodium are typically contained in an additional coating of that type, for applications relating to the exhaust-gas purification of internal combustion engines.

A suitable oxide coat can be produced on a foil according to the invention for example by virtue of the foil being subjected to a temperature of between 750 and 800° C. in air as an ambient atmosphere for a time of between 4 and 8 seconds, preferably approximately 6 seconds. This may take place for example while the foil passes through an annealing section, or in similar processes. The described foils are suitable for the production of honeycomb bodies of practically all known shapes and production methods in which steel foils have also previously been used.

Other features which are considered as characteristic for the invention are set forth in the appended claims.

Although the invention is illustrated and described herein as embodied in a metallic foil for producing honeycomb bodies, a honeycomb body produced therefrom and a method of producing a honeycomb body using a foil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
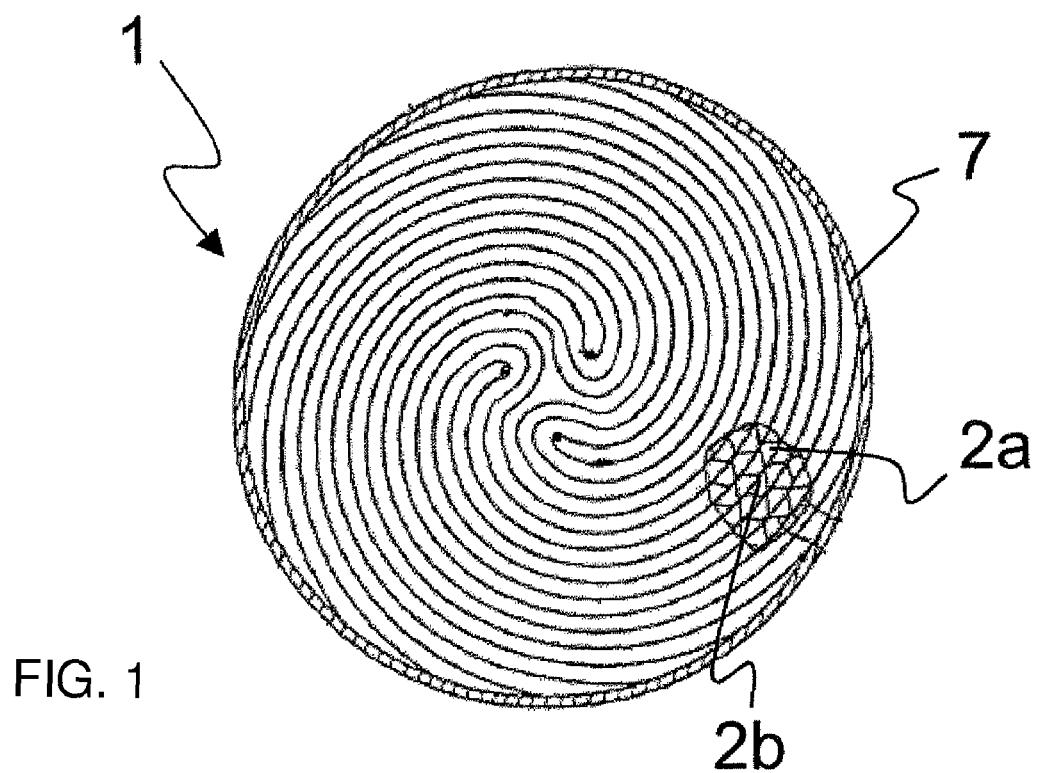
FIG. 1 is a diagrammatic, cross-sectional view of a honeycomb body.

Referring now to the figures of the drawings in detail and first, particularly, to FIG. 1 thereof, which is not to scale, there is seen a diagrammatic, end-side view of a honeycomb body 1, to which the invention is not restricted. The honeycomb body 1 is constructed from smooth metallic foils 2a and corrugated metallic foils 2b which are disposed in a casing tube 7. The precise shape of the foil layers is not of importance in the present case. The invention may be applied to practically all known shapes of metallic honeycomb bodies.

Figure 2:
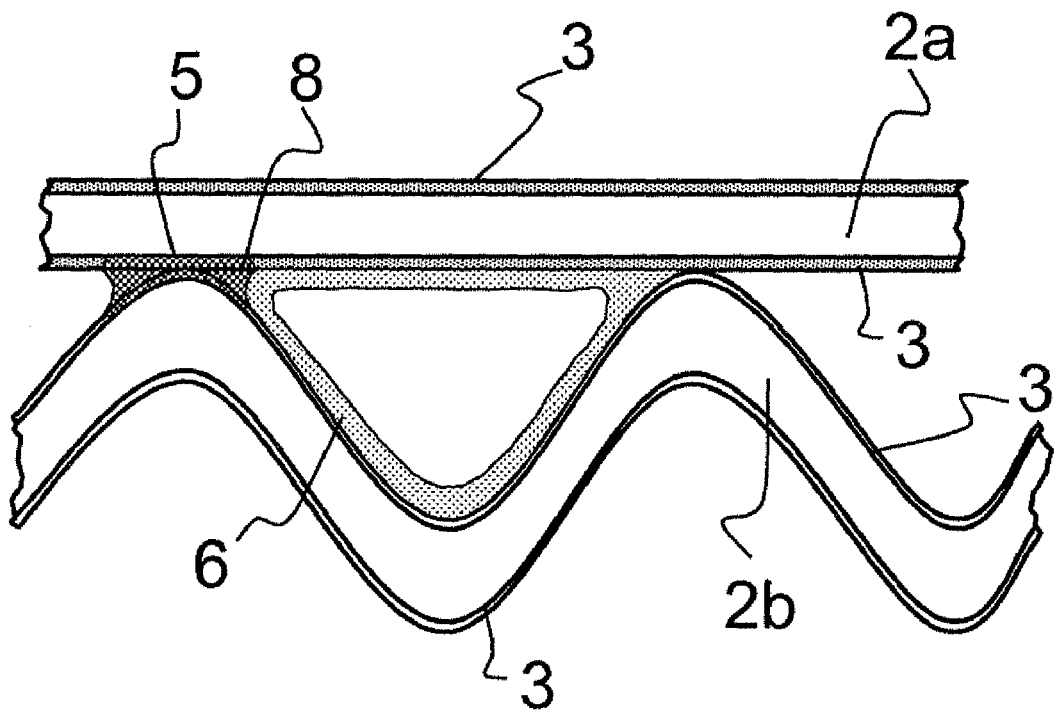
FIG. 2 is an enlarged, fragmentary, cross-sectional view of a region of a connecting point between two foils in a honeycomb body.

FIG. 2 shows a diagrammatic, sectional view of a smooth foil layer 2a and a corrugated foil layer 2b abutting against one another. A connecting point 5 is formed by brazing material 8 at a contact point of the foil layers 2a, 2b. Even though the foil layers 2a, 2b are provided according to the invention with oxide coats 3, fixed connecting points 5 can be generated by brazing. However, no connections are formed at contact points without brazing material, as is illustrated at an adjacent connecting point for comparison. The situation in a finished honeycomb body is indicated diagrammatically by an additional coating 6 which is typically applied after a honeycomb body is finished.

Figure 3:
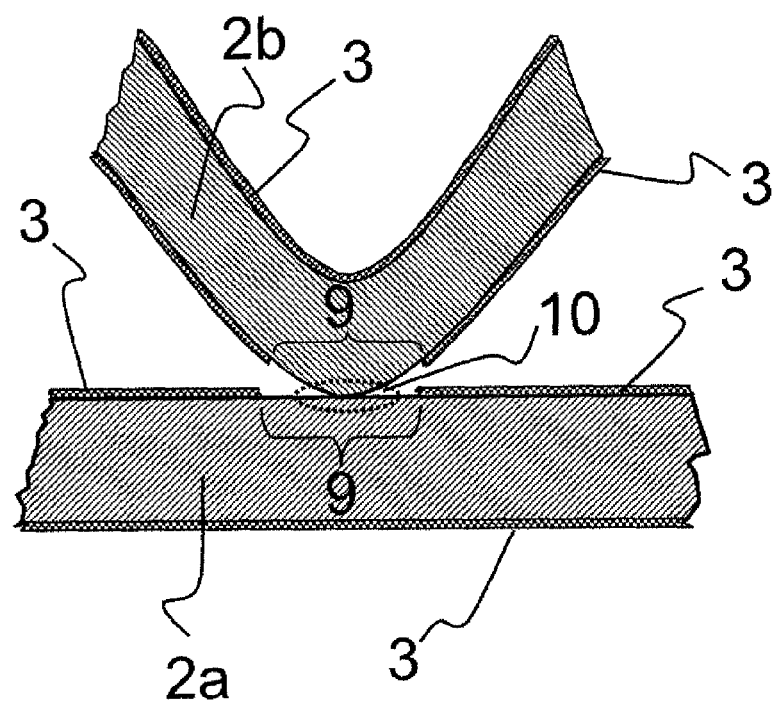
FIG. 3 is an enlarged, fragmentary, cross-sectional view of another example of a connecting point in a honeycomb body.

FIG. 3 shows the situation at a contact point between a smooth foil layer 2a and a corrugated foil layer 2b, if the oxide coat 3 is removed from the foil layers 2a, 2b in partial regions 9. In this case, a diffusion connection 10 is formed at the connecting point when the honeycomb body is heated.

Figure 4:
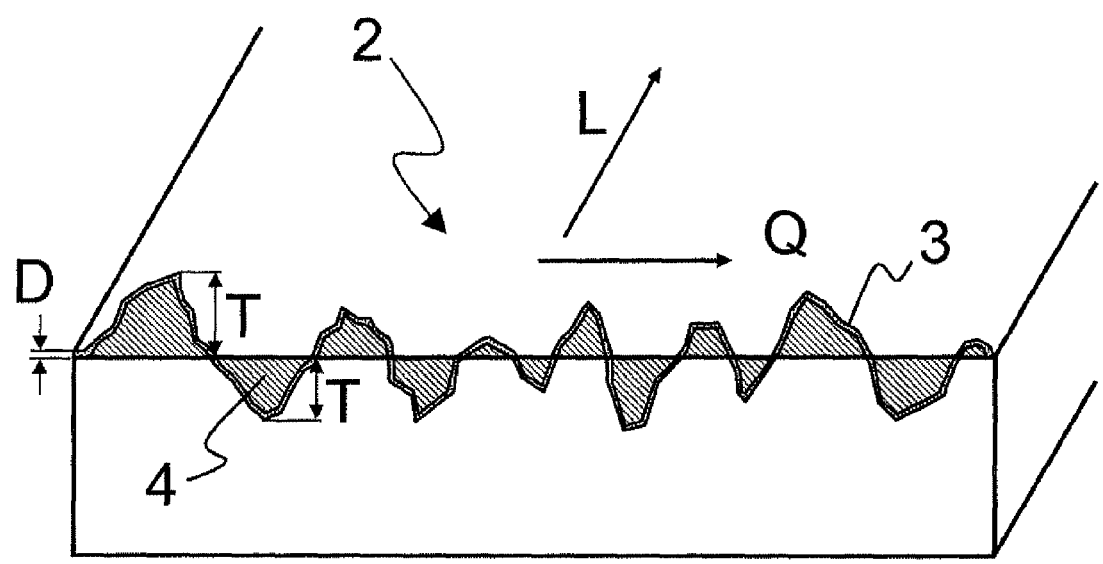
FIG. 4 is a further enlarged, fragmentary, partially-sectional, perspective view of a foil according to the invention.

FIG. 4 diagrammatically shows, in a partially sectional perspective view and exaggerated in terms of scale, the situation with regard to the coating and roughness on the surface of a foil 2 according to the invention. Foils of this type are typically produced in long strips by rolling, with the longitudinal direction being indicated in FIG. 4 by an arrow L, which corresponds to a rolling direction. The transverse direction, which is perpendicular to the longitudinal direction L and in which the roughness is diagrammatically illustrated, is indicated by an arrow Q. It can be seen that the oxide coat 3, with a thickness D, has a small dimension in relation to the roughness of the surface, that is to say it substantially follows the profile of the surface contour and does not, for example, even out the surface contour. A mean surface roughness is indicated diagrammatically by hatched areas. Peaks and depressions 4 of different depth T or height are formed on a foil surface, with the surface roughness specifying an average value of the deviation of the peaks and troughs from a mean level. The surface roughness is generally denoted by the symbol $R_a$. There are different options for influencing the roughness of a foil surface. For example, the roughness may be reduced by polishing and increased by brushing or blasting using suitable tools. The roughness range, which is particularly suitable for the invention, is greater than conventional values in the production of steel foils by rolling but it is possible, through the use of suitable rollers and rolling parameters, to produce foils with such roughness through the use of rolling without aftertreatment.

The present invention is particularly suitable for the production of durable, high-temperature resistant honeycomb bodies for use in exhaust-gas systems of internal combustion engines, in particular in motor vehicles.

The invention claimed is:

1. A foil for producing a metallic honeycomb body or catalyst carrier body, the foil comprising:
   two opposite foil surfaces;
   a high-temperature-resistant material having a mean surface roughness of greater than 0.3 µm (micrometers) in at least one measurement direction, on both of said surfaces, for producing the metallic honeycomb body or catalyst carrier body;
   said material being a metallic material composed of a high-temperature corrosion-resistant steel with chromium and aluminum components; and
   an oxide coat disposed on both of said surfaces and having a uniform thickness of between 60 and 80 nm (nanometers) with a tolerance of less than 10%.

2. The foil according to claim 1, wherein the foil is a rolled foil with a rolling direction and has said mean surface roughness of greater than 0.3 µm at least in a transverse direction perpendicular to said rolling direction.

3. The foil according to claim 2, wherein said mean surface roughness is in said transverse direction and in said rolling direction.

4. The foil according to claim 2, wherein said mean surface roughness is greater than 0.5 µm.

5. The foil according to claim 2, wherein said mean surface roughness is approximately 0.6 µm.

6. A method of producing a honeycomb body, the method comprising the following steps:
   producing a brazed honeycomb body with a foil according to claim 2 having a mean surface roughness of 0.6 µm to 0.8 µm.

7. The method according to claim 6, which further comprises placing an oxide coat with a thickness between 60 and 80 nm (nanometers) on both of said foil surfaces.

8. The method according to claim 7, wherein said thickness of said oxide coat is between 70 and 75 nm.

9. The foil according to claim 1, wherein said thickness of said oxide coat is between 70 and 75 nm.

10. The foil according to claim 1, wherein said metallic material contains 1 to 5% aluminum.

11. The foil according to claim 1, wherein said material contains 14 to 25% chromium and 3 to 5% aluminum.

12. The foil according to claim 11, wherein said material is composed of materials 1.4767 or 1.4725 according to the German Steel Key.

13. The foil according to claim 1, wherein said oxide coat is composed substantially of aluminum oxide.

14. The foil according to claim 13, wherein said aluminum oxide is y-aluminum oxide.

15. The foil according to claim 1, wherein said tolerance is less than 5%.

16. A honeycomb body, comprising:
a plurality of foil layers of at least one foil according to claim 1, including adjacent foil layers; and
brazed connecting points disposed between said adjacent foil layers only in selectively predetermined regions.

17. The honeycomb body according to claim 16, wherein said brazed connecting points are high-temperature vacuum-brazed connecting points.

18. The honeycomb body according to claim 16, which further comprises non-brazed, touching regions outside said connecting points not being connected to one another or being only weakly connected to one another by diffusion connections.

19. The honeycomb body according to claim 16, which further comprises an additional coating.

20. The honeycomb body according to claim 19, wherein said additional coating has at least one of a washcoat or catalytically active materials.

21. The honeycomb body according to claim 16, wherein the foil is a rolled foil and said material has said mean surface roughness in a rolling direction and a direction transverse to said rolling direction.

22. The honeycomb body according to claim 21, wherein said mean surface roughness is in a range of from 0.53 to 0.68 µm.

23. The honeycomb body according to claim 16, wherein said oxide coat is composed substantially of aluminum oxide.

24. The honeycomb body according to claim 16, wherein the foil has a rolled thickness of 20 to 180 µm.

25. The honeycomb body according to claim 16, wherein the foil has a rolled thickness in a range of from 30 to 120 µm.

* * * * *